Sept. 6, 1966 M. PAULL 3,270,614

SOUND SYSTEM FOR PICTURE SLIDES

Original Filed May 4, 1962

3,270,614

SOUND SYSTEM FOR PICTURE SLIDES

Morris Paull, Rochester, N.Y., assignor to Atron Corp., Rochester, N.Y., a corporation of New York Original application May 4, 1962, Ser. No. 192,479. Divided and this application Feb. 15, 1965, Ser. No. 432,739
9 Claims. (Cl. 88—28)

This application is a division of application Serial No. 192,479, filed May 4, 1962.

This invention relates to a sound system for picture slides, especially but not exclusively for slides intended for home projection and the like.

An object of the invention is the provision of a simple, satisfactory, and economical system for reproducing sound (whether it be voice or music or both) in connection with each individual slide of a series of slides when projected onto a viewing screen.

Another object is the provision of simple and satisfactory mechanism for recording the desired sound effects (whether voice or music or both) in connection with individual picture slides, and for changing the recorded sound effects from time to time, as desired.

Still another object is the provision of a sound recording and reproducing system adaptable to conventional slides mounted in conventional cardboard mounts of the customary size of 2 x 2 inches.

A further object is to provide an improved and efficient and easily manufactured hub or holder which, on the one hand, centrally receives the conventional cardboard mount of a picture slide, the corners of which are readily pressed into and frictionally retained in notches formed in the hub, and which, on the other hand, forms a bearing for rotation of an annular sound record disk having a large central aperture through which light may pass to or from the picture area of the slide.

Figure 1:
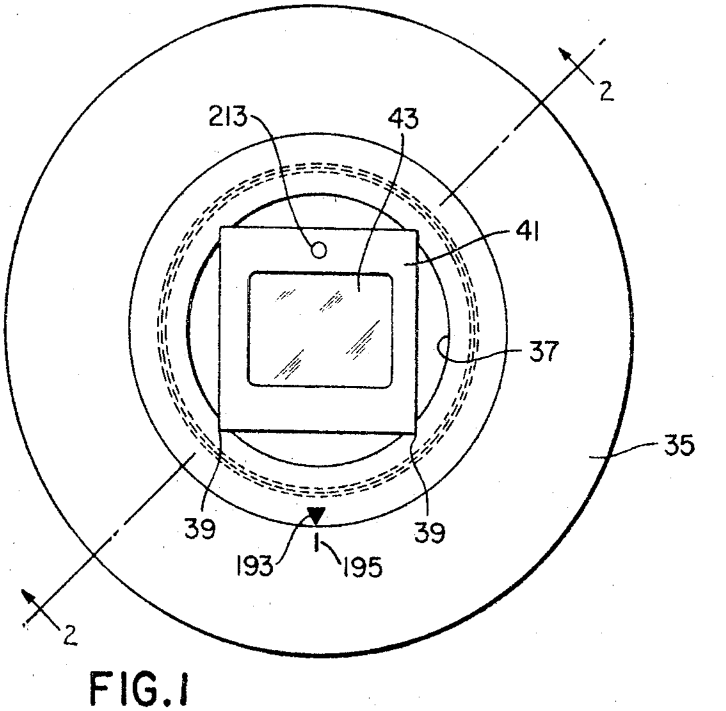
Figure 2:
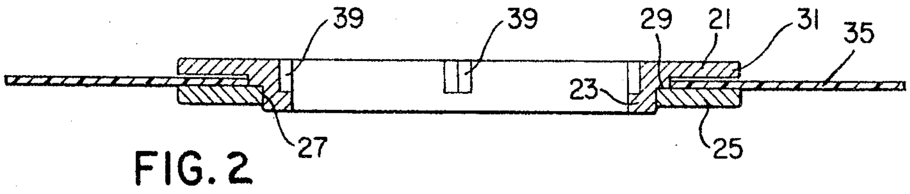

These objects may be attained in the manner disclosed in the following description and in the accompanying drawings forming a part hereof, in which:

FIG. 1 is a plan of a slide and sound record in assembled relation to the hub or holder of the present invention but removed from the projecting and reproducing apparatus; and FIG. 2 is a diametrical section substantially on the line 2—2 of FIG. 1, but on a larger scale, and with the slide removed.

The present construction comprises a novel sound record unit to be associated with an individual picture slide and to remain associated therewith during storage, during transportation and handling, and during projection of the picture contained on the slide.

Referring now to FIGS. 1 and 2, the sound record unit comprises an annular hub of suitable material (e.g., molded synthetic resin hereinafter called plastic material) which serves as a holder for retaining a picture slide in central relationship to the hub and as a bearing for an annular sound record which rotates around the hub while the hub remains stationary in picture-projecting position. The hub is made of two pieces, a first annular member 21 having an axially thickened inner rim 23, and a second annular member 25 which is merely a simple annular ring of uniform thickness, the inner periphery of which has a tight press fit on a circular shoulder 27 formed on the first member 21. A radial shoulder 29 serves as a stop to limit the motion of the ring 25 toward the radial flange 31 of the first hub member 21, so as to leave a space between the parts 25 and 31. In this space is the inner margin of a circular annular sound record 35, preferably of plastic flat disk form, and adapted to carry a sound recording either of the grooved type or of the magnetic type, both types being well known in the sound recording art, the details of the sound recording being unimportant and subject to wide variation so far as the present invention is concerned.

The two parts 21 and 25 of the hub are preferably of a plastic material having a relatively low coefficient of sliding friction with respect to the material of which the sound record 35 is made. For example, the sound record 35 may be of polyethylene or other material which is suitable for record grooving or for carrying the desired magnetic recording coating, and the hub members 21, 25 may be of low-friction material such as nylon or that sold under the trademarks "Teflon" or "Delrin," which may be impregnated with molybdenum disulphide to reduce still further the coefficient of friction, so that the sound record 35 will rotate on the hub 21, 25, smoothly and with great ease.

The first hub member 21 has a central aperture or window of at least the area of the photographic transparency which is to be projected. The central aperture need be no larger than the effective projectable area of the transparency, and thus it may be of square or rectangular shape, depending upon the kind of transparency. But for manufacturing ease and for saving material and minimizing weight of the hub assembly, the central aperture is preferably circular as shown at 37, with an internal diameter just slightly less than the diagonal of the side mount. With a slide or transparency mount of the usual two inch square size, the aperture has a diameter slightly less than 2.8 inches, and has four equally spaced notches 39 extending from one face of the hub part way but not all the way through the axial thickness thereof. The notches are of proper shape and dimensions to receive snugly the four corners of the standard 2 x 2 inch slide mount, with a tight frictional press fit. Such a slide is commonly but not necessarily made of cardboard, and is indicated at 41 in FIG. 1, and it forms a frame around the photographic transparency 43. The user may press a slide into the notches of the hub, and may press it out again whenever desired, but so long as it remains in the hub the slide, the hub, and the sound disk or record rotatable on the hub together form an assembly of parts which are handled together as a unit.

Any suitable means may be employed for holding the hub and the slide stationary in the beam of light of an optical projector, so that the picture or other image on the slide may be projected onto a viewing screen, and for simultaneously rotating the sound record 35 around the stationary hub and in cooperative relation to a sound reproducing or playback "head," so that the previously recorded sound may be heard simultaneously with viewing the image on the viewing screen.

The user may make his own sound recording on the record 35, and may play or reproduce the sound on the record, by conventional sound recording and reproducing means which are well known in the art, particularly in the filed of tape recorders and office dictating machines. When recording, a magnetic recording head produces a spiral magnetic sound track on the record disk 35, just as is done on the records of the well known spiral magnetic type of office dictating machine. As well understood in this field, one can dictate over a previous recording, automatically erasing the previous recording during the progress of the new dictation, so that the same sound record slides may be used over and over again with new dictation for new pictures, if desired. Because of the fact that the frame or mount 41 of the slide is simply held frictionally at its corners in the hub of the sound record, the picture slide can be very easily and quickly removed from the hub by axial pressure exerted on the slide from beneath, without damaging either the hub or the mount of the picture slide. Thus when the user becomes tired of a particular set of pictures, he can remove these pictures from his hubs, insert new picture slides in the hubs, and dictate new dialogue to go with the new slides, without having to go to the expense of purchasing new sound record units for the new slides. This makes the construction very economical for protracted use under varying conditions. But of course the original recording need not be changed, and it can be used over and over again as many times as desired, either with the original slide or with a new slide for which the same original sound record would still be appropriate.

In order to have a definite predetermined starting position of the spiral sound track with respect to the magnetic type sound reproducer (or needle type, if used) it is desirable always to place the sound record in the machine in a definite position of orientation. This is preferably accomplished by providing an index mark 193 on each hub, and an index mark 195 near the inner edge of each sound record 35. The index mark 195 need not interfere in any way with the last few convolutions of the spiral sound recording, as it can be marked by means of a nonmagnetic pigment which will not in any way affect the underlying magnetic recording coating on the disk.

If the hub is to be used with more than one kind of picture slide, the slide mounts of one kind may be provided with holes 213 differentiating them from the slide mounts of a different kind.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A hub for holding a picture slide and an annular sound record in predetermined relation to each other, characterized by the fact that said hub is of generally circular shape and has a central opening with notches in the periphery thereof for making a tight press fit with and frictionally retaining the corners of a picture slide mount, and that said hub also has a circumferentially extending groove for receiving the inner marginal edge of an annular sound record engaged in and guided for rotation by said groove.

2. A hub as claimed in claim 1, further characterized by the fact that the hub is made of two annular members having a tight press telescopic fit with each other, each member having an outer periperal flange spaced from the flange of the other member when the two members are in normal assembled relation to each other, so as to have an axial space between them, said flanges constituting the sides of the groove in which the annular sound record is guided, so that the record may be removed from the hub by first disassembling the two annular members of the hub from each other.

3. A hub as claimed in claim 2 further including an index mark on said hub for cooperation with an index mark on the annular sound record, for initially orienting the sound record in a particular rotational position with respect to the hub.

4. A hub as claimed in claim 1, further characterized by the fact that said central opening is of generally circular shape and that there are four of said notches spaced at equal intervals around said central opening.

5. A hub as claimed in claim 4, in which said notches extend only part way through the axial thickness of the hub member in which they are formed, the bottoms of the notches forming abutments limiting the depth to which the corners of a picture slide mount may be pressed axially into the notches.

6. For use in a combined picture projector and sound reproducer, a hub of generally circular shape having a central opening with notches in the periphery thereof for making a tight press fit with and frictionally retaining the corners of a picture slide mount, said hub also having a circumferentially extending groove, and an annular sound record having an inner marginal edge engaged in and guided for rotation by said groove.

7. A construction as defined in claim 6, in which said hub is made of low-friction plastic material.

8. A construction as defined in claim 6, in which said hub is made of two annular members having a tight press telescopic fit with each other, each member having an outer peripheral flange spaced laterally from the flange of the other member when the two members are in normal assembled relation to each other, so as to have an axial space between them, said flanges constituting the sides of the groove in which said annular sound record is guided, so that said record may be removed from said hub by first disassembling the two annular members of the hub from each other.

9. A holding device comprising a hub for holding a picture slide and an annular sound record in predetermined relation to each other, characterized by the fact that said hub it of generally circular shape and has a central opening with notches in the periphery thereof for receiving and frictionally retaining the corners of a picture slide mount, and said hub being further characterized by the fact that said hub is made of two annular members detachably connected to each other, each member having a surface spaced from a surface of the other at the periphery of the hub, so as to have a radial space between them when the two members are in normally assembled relation to each other, said radial space constituting a groove in which the annular sound record is guided.

References Cited by the Examiner

UNITED STATES PATENTS

| | | | |
|---|---|---|---|
| 2,093,746 | 9/1937 | White et al. | |
| 2,526,516 | 10/1950 | Supitilov | 88—28 |
| 3,063,338 | 11/1962 | Bregman | 88—26 X |
| 3,122,053 | 2/1964 | Dimitracopoulos et al. | 88—28 |
| 3,159,078 | 12/1964 | Schwartz et al. | 88—26 X |

NORTON ANSHER, *Primary Examiner.*

WILLIAM MISIEK, *Examiner.*

V. A. SMITH, *Assistant Examiner.*